United States Patent [19]

Phelps et al.

[11] Patent Number: 4,856,586
[45] Date of Patent: Aug. 15, 1989

[54] METHOD FOR IMPARTING SELECTIVITY TO OTHERWISE NONSELECTIVE POLYMER PROFILE CONTROL GELS

[75] Inventors: Craig H. Phelps, Carrollton; E. Thomas Strom, Dallas, both of Tex.

[73] Assignee: Mobil Oil Corporation, New York, N.Y.

[21] Appl. No.: 201,239

[22] Filed: Jun. 2, 1988

[51] Int. Cl.⁴ ............... E21B 43/22; E21B 43/24; E21B 33/138
[52] U.S. Cl. ................... 166/270; 166/272; 166/274; 166/295; 166/300; 523/130
[58] Field of Search ............... 166/270, 272, 274, 294, 166/295, 300; 405/264; 523/130, 132

[56] References Cited

U.S. PATENT DOCUMENTS

| | | | |
|---|---|---|---|
| 3,421,584 | 1/1969 | Eilers et al. | 166/295 |
| 3,557,562 | 1/1971 | McLaughlin, Jr. et al. | 166/295 X |
| 3,908,760 | 9/1975 | Clampitt et al. | 166/270 X |
| 4,069,869 | 1/1978 | Sandiford | 166/270 |
| 4,085,801 | 4/1978 | Sifferman et al. | 166/294 X |
| 4,085,802 | 4/1978 | Sifferman et al. | 166/295 |
| 4,606,407 | 8/1986 | Shu | 166/270 |
| 4,688,639 | 8/1987 | Falk | 166/295 |
| 4,706,754 | 11/1987 | Smith | 166/295 |
| 4,712,617 | 12/1987 | Kocsis | 166/270 |
| 4,750,562 | 6/1988 | Jennings, Jr. | 166/294 X |

*Primary Examiner*—George A. Suchfield
*Attorney, Agent, or Firm*—Alexander J. McKillop; Charles J. Speciale; Charles A. Malone

[57] ABSTRACT

A method for selectively closing pores in a zone of greater permeability in a formation for profile control. A rehealable Xanthan biopolymer is combined with a crosslinked non-selective polyacrylamide polymer gel. The combined gel system is injected into a formation where the Xanthan biopolymer gel selectively enters a zone of greater permeability carrying therewith said non-slective gel. Once in the formation's zone of greater permeability, the gel reheals and forms a rigid gel with substantially better temperature stability.

21 Claims, No Drawings

METHOD FOR IMPARTING SELECTIVITY TO OTHERWISE NONSELECTIVE POLYMER PROFILE CONTROL GELS

FIELD OF THE INVENTION

This invention relates to the use of gels for profile control so that increased amounts of hydrocarbonaceous fluids can be obtained from a lesser permeability zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often posses different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and this divert the displacing fluid into the low permeability, oil rich zones. Among the polymers examined for improving waterflood conformance are metal-crosslinked polysaccharides, metal-crosslinked polyacrylamides, and organic-crosslinked polyacrylamides.

Basic to the problem of diverting displacing fluid with polymeric gels is the necessity of placing the polymer where it is needed, i.e. in the high permeability zone. This is not difficult if the gel is formed above ground. Xanthan biopolymers may be crosslinked with metal ions such as $CR^{+3}$ above ground to give gels. These gels are shear thinning and can be injected into the formation where they then reheal. Since gel particles are being injected, they will of necessity go into high permeability zones. However, many other gel systems are formed in-situ. One system disclosed in U.S. Pat. No. 3,557,562 contains acrylamide monomer, methylene-bis-acrylamide as an organic crosslinker, and a free radical initiator. This system undergoes polymerization in the formation to give a polyacrylamide crosslinked with methlene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of crosslinking hydrolyzed polyacrylamide. Even though the polyacrylamide solution has a viscosity greater than water, it is not capable of showing the selectivity that a gel can. Thus, polyacrylamides crosslinked with chromium in-situ can also go into low permeability zones. It is not useful to crosslink polyacrylamides above ground and inject them as gels, because polyacrylamide gels undergo shear degradation.

Therefore, what is needed is a method where a shear thinning rehealable ex-situ gel can be combined with an in-situ gel so as to obtain greater selectivity in closing a zone of greater permeability in a formation while forming a gel having substantially better qualities to withstand formation conditions.

SUMMARY

This invention is directed to a method for sequential gellation into a formation having varying permeabilities. In the practice of this invention, a first gel is placed into an aqueous solution in an amount sufficient to enter pores in a formation's zone of greater permeability. This gel forms ex-situ and is shear thinning. Afterwards, a second gel is formed in-situ. Said second gel is substantially more resistant to formation conditions than said first gel.

After mixing, the aqueous solution containing the gelled ex-situ gel and the ungelled in-situ gel is directed into the formation's zone of greater permeability. Said ex-situ gel selectivity enters pores in the zone of greater permeability. Here it reheals. Thereafter, heat from the formation causes the in-situ gel to firm and form a solid gel which is substantially more resistant to formation conditions than said first gel.

It is therefore an object of this invention to make a gel system where one gel can selectively enter a high permeability zone and reheal while transporting a substantially thinner non-selective gel into said high permeability zone.

It is another object of this invention to keep a thinner in-situ gel from entering a zone of lesser permeability.

It is yet another object of this invention to place a substantially less viscous gel into a formation's zone of greater permeability where it can form in-situ a gel substantially more resistant to formation condition.

It is still another object of this invention to place a substantially less viscous gel into a high permeability zone without utilization of mechanical isolation.

It is a yet still further object of this invention to place a polyacrylamide polymer crosslinked with methylene-bis-acrylamide into a low permeability zone where it can form a gel in-situ.

BRIEF DESCRIPTION OF THE PREFERRED EMBODIMENTS

Sequential gellation can be accomplished by the inclusion of an ex-situ and an in-situ gel into one system. In the preparation of this system two functionally different gels are utilized. One gel is utilized to obtain selectivity so that the combined gel system can enter zones of greater permeability in a formation. Another gel is used to obtain increased rigidity and better temperature stability. Utilization of the combined system allows it in one sequence to enter a more permeable zone of the formation. In another sequence, the combined system propagates a desired distance into a formation. Once the system has propagated to the desired distance into the formation, it forms a rigid gel having substantially better temperature stability.

In one embodiment of this invention, a biopolymer gel is utilized for formation selectivity, and an organic crosslinked polyacrylamide gel is utilized for rigidity and increased thermal stability. The preferred biopolymer for utilization herein is a Xanthan biopolymer which is obtainable from Pfizer Co. The trademarked product is marketed as Flocon 4800C. The polyacrylamide preferred for utilization is a polyacrylamide crosslinked with methylene-bis-acrylamide.

A typical formulation of Xanthan biopolymer consists of 2000 ppm Flocon 4800C, 100 ppm NaOH, and 80 ppm $Cr^{+3}$. This formulation forms a gel in about four hours, although gelation starts soon after addition of $Cr^{+3}$. The four hour gel is capable of being injected into a formation because it is shear thinning but it will reheal. The Flocon 4800C gel is reasonably firm with a consistency like that of agar or gelatin. Due to gel instability at higher temperatures, the useful temperature limit for Flocon 4800C gels is about 140–150° F.

A typical commercial formulation of polyacrylamide crosslinked with methylene-bis-acrylamide contains 10% acrylamide and 0.36% methylene-bis-acrylamide. Free radical polymerization is accomplished with initiators such as peroxides or azo compounds that decompose at reservoir temperatures. The use of activators such has alkanol amines can further reduce the temperature needed for free radical initiation. Polymerization retarders can be added to delay gelation so that the polymer penetrates the formation. Until gelation occurs, the viscosity of the system is like that of water. The gel when formed is extremely rigid and undergoes no syneresis. With the incorporation of a proprietary stabilizer the gels are stable to about 200° F. This type of gel is useful in reservoir situations (e.g. temp >140° F.) where conventional Xanthan gels are not recommended. However, the gel precurser system will show no selectivity.

Nevertheless, sequential gelation of a combined system is not straightforward as is shown by the following two baseline experiments.

Baseline Experiment 1. A mixture consisting of 2000 ppm Flocon 4800C (commercial Xanthan biopolymer), 100 ppm NaOH, and 80 ppm $Cr^{+3}$ is made up in 7% brine and allowed to stand at room temperature. A gel is formed in four hours with the typical consistency of a Flocon 4800C gel, firm but not rigid, syneresing over time.

Baseline Experiment 2. A mixture consisting of 2000 ppm Flocon 4800C, 100 ppm NaOH, 80 ppm $Cr^{+3}$, 100,000 ppm acrylamide, 3600 ppm methylene-bis-acrylamide, 1200 ppm sodium persulfate, and 562 ppm triethanol amine is made up in 7% brine and allowed to stand at room temperature. A gel is formed in 2-1/2 hours with the typical consistency of an organic crosslinked polyacrylamide gel, rigid with no syneresis.

The second baseline experiment shows that a free radical polymerization has taken place at room temperature, so that the system goes directly to the organic crosslinked polyacrylalmide gel without the intervention of the Flocon 4800C gel. This result probably stems from the redox initiator with the $Cr^{+3}$ catalyzing the breaking of the peroxide bond, perhaps assisted by the triethanol amine. The equation for the probable reaction is shown below.

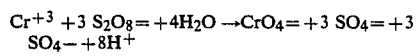

For this reason, it is necessary to add a polymerization retarder such as potassium ferricyanide to obtain sequential gelation. The successful implementation of this invention is shown in the following two examples.

EXAMPLE 1

A 200 g mixture was made up of 2000 ppm Flocon 4800C, 100 ppm NaOH, 800 ppm $Cr^{+3}$, 100,000 ppm acrylamide, 3600 ppm methylene-bis-acrylamide, 2400 ppm sodium persulfate, and 1000 ppm potassium ferricyanide in a 7% brine. The mixture was split in half with each half being placed in a jar. The jars were left left at room temperature for four hours. At the end of that time both jars contained gel. The gels appeared to be typical chromium crosslinked Flocon 4800C gels. Then one jar was placed in a 130° F oven; the other was left on the bench top. The gel in the oven appeared to start firming after one hour. It was left in the oven overnight. During this time period, it changed to a rigid organic crosslinked polyacrylamide type gel. The transition time was between 3 and 19 hours after the gel was placed in the oven. After five weeks in the oven at 130° F, the gel is still rigid and has shown no syneresis. The gel left on the bench top at room temperature remained a less firm Xanthan-type gel for two weeks with about 20% syneresis. After two weeks, the gel then changed to a rigid organic crosslinked polyacrylamide type gel.

EXAMPLE 2

A 130 g mixture was made up of 3000 ppm Flocon 4800C, 150 ppm NaOH, and 120 ppm $Cr^{+3}$ in a 7% brine. The mixture gelled to a typical Flocon 4800C (Xanthan) gel in a little less than four hours. Then 70 g of a mixture containing 20 g of acrylamide, 0.72 g methylene-bis-acrylamide, 0.48 g sodium persulfate, and 0.1 g potassium ferricyanide in 7% brine was blended into the gel. After blending, the concentration of the components is approximately equal to that of Example 1. The mixture was split in half with each half being placed in a jar. One jar was put in a 130° F oven; the other was left on the bench top. The sample in the oven changed to an extremely firm organic crosslinked polyacrylamide type gel overnight. The transition time was between 3 and 19 hours after the gel was placed in the oven. While it was not immediately as rigid as the organic crosslinked polyacrylamide gel of Example 1, it achieved comparable rigidity in a few days. After five weeks in the oven, the gel is still rigid with no syneresis. The gel left on the bench top at room temperature remained a less firm Xanthan gel for two weeks with −25% syneresis. The gel then changed to a rigid organic crosslinked polyacrylamide type gel.

These examples show that it is possible to form the Xanthan type gel, which gives selectivity, and the organic crosslinked polyacrylamide type gel, which given rigidity and better temperature stability, sequentially as would be needed to propagate the gel system selectively in a formation. Furthermore, the presence of Xanthan components does not affect the desirable characteristics of the organic crosslinked polyacrylamide gel. The application of this concept to other polymeric gels should be straightforward.

When utilized in the field for profile control purposes, the gelation rate of the system will depend on the amount of the components and the temperature at which the reaction is conducted. Thus, one can tailor the gel rate and the gel strength of the system by adjusting the amount of polymer, the crosslinker, the initiator, the polymerization retarder, pH, and temperature. The higher the temperature at given concentrations of crosslinker and polymer, the faster the gelation time. If a thicker gelled composition is desired, the polymer and crosslinker concentrations may be increased for a given temperature.

In preparing the gel system for utilization herein, the aqueous solution can comprise fresh water, brackish water, sea water, produced formation waters and mixtures thereof. A brine comprising sodium chloride in about 1 wt. % to 20 wt. %, preferably about 7.0 wt. % can be utilized. Xanthan biopolymer can be used in an amount of from about 1000 to about 5000 ppm. Chromic ions utilized should be from about 30 to about 300 ppm. Other polyvalent metal ions which can be utilized include aluminum, boron and iron. Alkali metal hydroxides which can be utilized include sodium and potassium hydroxide. Sodium hydroxide is preferred. The amount of alkali or alkaline earth metal hydroxide utilized should be from about 10 to about 1000 ppm, preferably about 100 ppm. Acrylamide polymer used herein should be from about 40,000 to about 200,000 ppm, preferably 100,000 ppm. Methylene-bis-acrylamide should be utilized in an amount from about 500 to about 5000 ppm, preferably about 3,600 ppm. Sodium persulfate can be used in an amount of from about 1000 to about 4000 ppm, preferably 2400 ppm. Potassium ferricyanide can be included in an amount of from about 200 to about 2000 ppm, preferably about 1000 ppm.

Considerable latitude exists in the design of field processes employing polymeric slugs containing both selective and non-selective polymers. For example, to minimize any damage to the low permeability zones from the non-selective polymer during the initial stages of injection, the concentration of this component in the slug can be lowered until such time as the selective polymer has effectively isolated the low permeability zones from further invasion of fluid via filter cake formation. This is a preferred embodiment of the invention where the permeability contrast between zones is not large.

Where it is desired to obtain increased sweep efficiency, gels of this invention can be used to plug a previously swept portion of a formation. Said gels can be directed to areas of increased porosity by utilization in any of the below methods.

One method where gels of this invention can be utilized is during a waterflooding process for the recovery of oil from a subterranean formation. After plugging the more permeable zones of a reservoir with the sequential gel system of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the procedure described herein are detailed in U.S. Pat. Nos. 4,489,783 and 3,918,521 issued to Shu and Snavely, respectively. These patents are hereby incorporated by reference herein. Of course, for such a situation the in-situ gel must be capable of withstanding steam temperatures.

The sequential gel system described herein can also be used in conjunction with a cyclic carbon dioxide steam stimulation in a heavy oil recovery process to obtain greater sweep efficiency. Cyclic carbon dioxide steam stimulation can be commenced after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process by lowering the carbon dioxide minimum miscibility pressure ("MMP") and recovering oil. Prior to commencement of the carbon dioxide process, the more permeable zones are plugged with this novel gel system. Carbon dioxide MMP in an oil recovery process is described in U.S. Pat. No. 4,513,821 issued to Shu which is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for sequential gellation in a formation having varying permeabilities comprising:
    (a) making an aqueous solution containing a composition sufficient to form a first gel in an amount sufficient to enter pores in a formation's zone of greater permeability which gel forms ex-situ and is shear thinning;
    (b) allowing sufficient time for the composition to form a gel ex-situ;
    (c) placing into said first gel an aqueous solution containing a precursor system for a second gel which forms in-situ and make a gel substantially more resistant to formation conditions than said first gel; and
    (d) injecting said aqueous solution containing said first gel into said zone of greater permeability where said solution enters the zone of greater permeability and subsequentially forms a second solid gel substantially more resistant to formation conditions than said first gel.

2. The method as recited in claim 1 where said first gel forms in about four hours at ambient temperature so as to make a firm but not rigid gel which withstands formation temperatures of up to about 150° F.

3. The method as recited in claim 1 where said second gel forms a substantially rigid gel which undergoes substantially no syneresis and which can withstand formation temperatures up to about 200° F.

4. The method as recited in claim 1 where said composition contains Xanthan biopolymer in an amount of from about 1,000 to about 5,000 ppm by weight, 30 to about 300 ppm of chromic ions, and 10 to about 1,000 ppm of NaOH where said aqueous solution contains about 1 to about 20 wt. % NaCl.

5. The method as recited in claim 1 where said precursor system is a mixture of acrylamide and methylene-bis-acrylamide in an amount of from about 40,000 to about 200,000 ppm acrylamide, from about 500 to about 5,000 ppm methylene-bis-acrylamide, about 1,000 to about 4,000 ppm sodium persulfate, about 200 to about 2,000 ppm potassium ferricyanide where said solution contains about 1 to about 20 wt. % NaCl.

6. The method as recited in claim 1 where a water flood, a steam flood, or a carbon dioxide flood is directed into a zone of lesser permeability following step c).

7. The method as recited in claim 1 where a polymerization retarder is placed into said aqueous solution so as to allow propagation to a desired distance into said more permeable formation zone.

8. A method for gellation of a formation having zones of varying permeability comprising:
    (a) placing into an aqueous solution a first composition sufficient to form ex-situ a size selective, shear thinning first gel sufficient to enter pores in a formation's greater permeability zone where it reheals, (b) placing into said aqueous solution a second composition sufficient to form a second in-situ gel which is substantially more resistant to formation conditions than said first gel;
(c) allowing said aqueous solution sufficient time to form the ex-situ gel; and
(d) injecting said aqueous solution containing said gel into the formation where it enters the zone of greater permeability and thereafter forms a second solid gel substantially more resistant to formation conditions than said first gel.

9. The method as recited in claim 8 wherein said composition contains Xanthan biopolymer in an amount of from about 1,000 to about 5,000 ppm by weight, 30 to about 300 ppm of chronic ions, and 10 to about 1,000 ppm of NaOH where said aqueous solution contains about 1 to about 20 wt. % NaCl.

10. The method as recited in claim 8 where said second composition is a mixture of acrylamide and methylene-bis-crylaimde in an amount of from about 40,000 to about 200,000 ppm acrylamide, from about 500 to about 5,000 ppm methylene-bis-acrylamide, about 1,000 to about 4,000 ppm sodium persulfate, about 200 to about 2,000 ppm potassium ferricyanide where said solution contains about 1 to about 20 wt. % NaCl.

11. The method as recited in claim 8 where said first gel forms in about four hours at ambient temperature so as to make a firm but not rigid gel which withstands formation temperatures of up to about 150° F.

12. The method as recited in claim 8 where said second gel forms a substantially rigid gel which undergoes substantially no syneresis and which can withstand formation temperatures up to about 200° F.

13. The method as recited in claim 8 where a water flood, a steam flood, or a carbon dioxide flood is directed into a zone of lesser permeability following step (d).

14. A method for gellation of a formation having zones of varying permeability comprising:
(a) placing into an aqueous solution a first composition sufficient to form ex-situ a size selective shear thinning first gel which comprises
 (i) a Xanthan biopolymer;
 (ii) sodium hydroxide, and
 (iii) a polyvalent metal ion
(b) placing into said aqueous solution a second composition sufficient to from a second in-situ gel which is substantially more resistant to formation conditions than said first gel which comprises
 (i) a polyacrylamide polymer,
 (ii) an organic cross-linker,
 (iii) an initiator, and
 (iv) a polymerization retarder
(c) allowing said aqueous solution sufficient time to form the ex-situ gel; and
(d) injecting said aqueous solution containing said gel into the formation where it enters a zone of greater permeability, reheals and thereafter forms a solid gel substantially more resistant to formation conditions than said first gel.

15. The method as recited in claim 14 where said first composition contains Xanthan biopolymer in an amount of from about 1,000 to about 5,000 ppm by weight, 30 to about 300 ppm of chromic ions, and 10 to about 1,000 ppm of NaOH where said aqueous solution contains about 1 to about 20 wt. % NaCl.

16. The method as recited in claim 14 where second composition comprises about 40,000 to about 200,000 ppm acrylamide, from about 500 to about 5,000 ppm methylene-bis-acrylamide, as the organic cross-linker, about 1,000 to about 4,000 ppm sodium persulfate, as the initiator, about 200 to about 2,000 ppm potassium ferricyanide, as the retarder where said solution contains about 1 to about 20 wt. % NaCl.

17. The method as recited in claim 14 where said first gel forms in about four hours at ambient temperature so as to make a firm but not rigid gel which withstands formation temperatures of up to about 150° F.

18. The method as recited in claim 14 where said second gel forms a substantially rigid gel which undergoes substantially no syneresis and which can withstand formation temperatures up to about 200° F.

19. The method as recited in claim 14 where a water flood, a steam flood, or a carbon dioxide flood is directed into a zone of lesser permeability following step (d).

20. The method as recited in claim 14 where gel rate and gel strength are controlled by adjusting the amount of polymer, the cross-linker, an initiator, a polymerization retarder, pH, and temperature.

21. The method as recited in claim 14 where polymer contained in said second composition is lowered while initially injecting the aqueous solution into the formation to minimize damage to a zone of lower permeability in said formation.

* * * * *